(12) United States Patent
Jones et al.

(10) Patent No.: US 6,688,456 B2
(45) Date of Patent: Feb. 10, 2004

(54) BOTTLE ALIGNMENT PACKAGING APPARATUS

(75) Inventors: Kenneth J. Jones, Dillsboro, IN (US); Barry Grainger, Bellevue, KY (US)

(73) Assignee: Ashland Inc., Lexington, KY (US)

( * ) Notice: Subject to any disclaimer, the term of this patent is extended or adjusted under 35 U.S.C. 154(b) by 0 days.

(21) Appl. No.: 09/823,295

(22) Filed: Mar. 30, 2001

(65) Prior Publication Data

US 2001/0054537 A1 Dec. 27, 2001

Related U.S. Application Data

(60) Provisional application No. 06/192,821, filed on Mar. 29, 2000.

(51) Int. Cl.$^7$ ............................ B65G 47/24; B65G 37/00
(52) U.S. Cl. ........................................ 198/415; 198/623
(58) Field of Search ................. 198/407, 382, 198/415, 623, 836.1, 836.3

(56) References Cited

U.S. PATENT DOCUMENTS

| | | | |
|---|---|---|---|
| 2,667,959 A | * | 2/1954 | Rogers ....................... 198/416 |
| 3,427,779 A | | 2/1969 | Goldman |
| 3,439,792 A | | 4/1969 | Frank et al. |
| 3,462,001 A | * | 8/1969 | Boyce ........................ 198/415 |
| 3,495,441 A | | 2/1970 | Laub |
| 3,618,743 A | | 11/1971 | Benatar |
| 3,930,574 A | * | 1/1976 | Iwata et al. ................. 198/373 |
| 4,457,421 A | | 7/1984 | Kross et al. |
| 4,653,628 A | * | 3/1987 | Claypool et al. ........... 198/415 |
| 4,901,842 A | | 2/1990 | Lemboke et al. |
| 5,050,724 A | | 9/1991 | Nordstrom |
| 5,074,400 A | | 12/1991 | Focke et al. |
| 5,551,550 A | | 9/1996 | Marshall et al. |
| 5,667,055 A | | 9/1997 | Gambetti |
| 5,701,726 A | | 12/1997 | Smith |
| 5,873,450 A | | 2/1999 | Rusch et al. ................ 198/415 |

* cited by examiner

Primary Examiner—Cristopher P. Ellis
Assistant Examiner—Gene O. Crawford
(74) Attorney, Agent, or Firm—David W. Carrithers; Carrithers Law Office (57) ABSTRACT

Apparatus for reorienting containers such as bottles moving along and guided in single file along a plurality of side-by-side lanes in which the reorienting unit has a plurality of modular units each with an endless belt and operating in pairs to turn the containers a predetermined amount about a vertical axis in each of the respective lanes.

21 Claims, 7 Drawing Sheets

BOTTLE ALIGNMENT PACKAGING APPARATUS

This application claims benefit of Prov. No. 60/192,821 filed Mar. 29, 2000.

BACKGROUND OF THE INVENTION

1. Technical Field

This invention relates generally to apparatus for re-positioning containers by changing the facial orientation of the same as they move from one location to another and more particularly to a plurality of modular units that do so in a plurality of side-by-side lanes.

2. Description of the Prior Art

Various devices are known for reorientating containers, bottles, flasks or the like as such articles during their manufacture or subsequent inspection, filling, labeling and/or packaging. In many applications the containers are randomly oriented on a conveyor by which they are conveyed from one location to another. In many such instances it is necessary to rotate the container about their respective vertical axes to present predetermined portions thereof to the various process steps at hand such as labeling, filling, packing etc. Conventional methods often employ an apparatus wherein the bottles enter a chute with the neck leading whereby the bottle neck strikes a lug and is forced to turn ninety degrees. Many other prior art article orienting devices for cylindrical bottles require a projection molded into each bottle. The projections engage detents or the like on moving belts or activate switches. This arrangement is suitable for symmetrical bottles i.e. cylindrical containers but not for non-cylindrical containers. Frequently non-symmetrical bottles are manually reoriented and this labor intensive operation is inefficient and if not done manually then many sensors are required.

For instance, U.S. Pat. No. 5,074,400 granted Dec. 24, 1991 to H. Focke et al teaches a conveyor system that includes a pair of counter rotating belts to change the orientation of cigarette packs. U.S. Pat. No. 4,653,628 granted Mar. 31, 1987 teaches a sophisticated control system for controlling a pair of counter rotating belts that change the orientation of containers. A disadvantage of each of these devices is that in each instance the counter rotating belt apparatus is massive taking up a lot of space and thus is not suitable for handling multiple side-by-side lanes of containers.

SUMMARY OF INVENTION

This invention relates generally to apparatus for re-positioning containers by changing the facial orientation of the same as they move from one location to another and more particularly to a plurality of modular units that do so in a plurality of side-by-side lanes. The containers are reoriented by being rotated about a vertical axis by being engaged between a pair of counter-rotating members. The present invention is particularly directed to a modular unit having a rotatable member such as an endless belt and an assembly of pairs of such modular units mounted for reorienting containers as they move in single file along a plurality of side-by-side lanes and a container reorienting system. Containers of concern herein are generally molded of a plastics material or glass or the like but it will become obvious, to those skilled in the art, applicants apparatus will be applicable to many different containers capable of being grasped, or having a portion thereof grasped, in the bite between a pair of horizontally spaced apart counter-rotating members. The apparatus and method of use is particularly important for positioning rectangular bottles having offset spouts such as oil bottles in that it provides a means for orienting the bottles such that the bottle spouts are oriented along the outer edges of the box or carton or other packaging for providing optimal structural support along the periphery of the package for supporting and distributing the weight of stacked boxes, cartons, or packaging means thereon and maximizing stability for storage and/or shipping.

More particularly, the present invention is a container handling apparatus which defines a conveyor means for supporting and moving containers from a first location to a second location downstream from the first location. A guide means is supported at an elevation above the conveyor to guide the containers in single file along each of a plurality of side-by-side lanes in a direction from the first location toward the second location. A container reorienting apparatus disposed between the first and second locations and includes a frame, a pair of modular units mounted on the frame for each of the respective lanes. Each one of the modular units have a power driven member mounted thereon whereby each pair of modular units provides power driven respective first and second pair of counter-rotatable members spaced apart from one another in a direction transverse to the lane associated therewith and located adjacent respectively opposite sides thereof. The counter rotatable members are disposed at an elevation above the upper surface of the conveyor at a position whereby they engage respectively selected opposite side portions of the containers while the containers move a preselected distance along their respective paths. Also included is a drive means drivingly connected respectively to the first and second counter-rotatable members of the respective pairs.

An object of the present invention is provide a compact multiple lane article reorienting apparatus for use in association with conveyors that move articles along a plurality of paths.

A further object of the present invention is to provide an apparatus for repositioning articles to change their facial orientation as they move along in single file along a plurality of side-by-side lanes.

A still further object of the present invention is to provide a modular unit and an assembly of such modular units for use in association with an article conveyor to change the facial orientation of a plurality of articles on the conveyor from a first to a second position as the articles are moved in single file along each of a plurality of side-by-side lanes.

A further principal object of the present invention is to provide a conveying system and apparatus for repositioning a plurality of containers to facilitate packaging the same.

These and other objects are achieved by applicants preferred embodiment of the present invention in which the container reorienting apparatus incorporates a plurality of pairs of modular units mounted on a support structure with each modular unit having a rotatable member such as an endless belt whereby each pair of modular units provide two spaced apart counter rotatable belts that engage a portion of respective opposite sides of a container. The belts in each pair are driven at a predetermined speed with the speed of one being different from the speed of the other. The differential speed of the belts rotates the containers in each of a plurality of paths with the containers moving in single file in each such path. Obviously in order to rotate a container the force provided by frictional engagement in the grasp therewith must be greater than the force to overcome the frictional engagement of the container with the conveyor surface carrying the container that resists turning the container.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
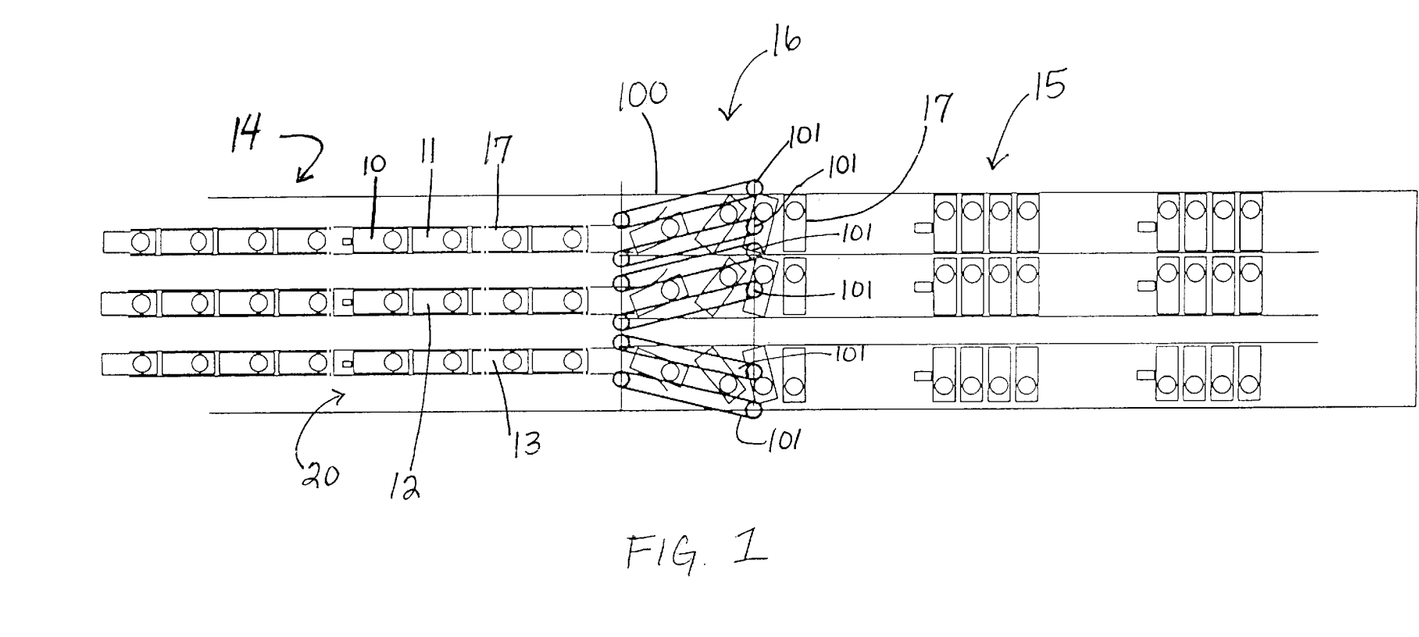
FIG. 1 is a diagrammatic top plan view of an article handling system of the present invention that includes in combination a conveyor for moving the articles from one location to another and a particular apparatus provided in accordance with the present invention for changing the facial orientation of the containers from a first position to a second position as they move side-by-side lanes from the one location to the other.

Illustrated in FIG. 1 is a container handling system that moves a plurality of containers 10, depicted by oil bottles having an offset spout, in single file along three side-by-side lanes 11, 12 and 13 from a first general location 14 to a second general location 15 and at some general location 16 there between each container is rotated by a container reorienting apparatus 100 that changes the facial orientation of the containers. By way of explanation with respect to "facial orientation" the containers 10 in the illustrated embodiment are rectangular in outline having a side face 17 that is parallel to the path of travel upstream of the apparatus 100 and downstream therefrom after being reoriented that face is perpendicular to the path of travel. Each container thus has a change of facial orientation.

While the present invention is particularly concerned with suitably orienting and grouping containers, such as oil or the like filled one quart plastic containers, to facilitate packaging thereof it will be applicable to other container handling operations as will be readily apparent to those skilled in the art. Also, in the present embodiment each container is rotated thru an arc of 90 degrees but the amount of rotation can readily be preset to that desired for the task at hand.

Figure 3:
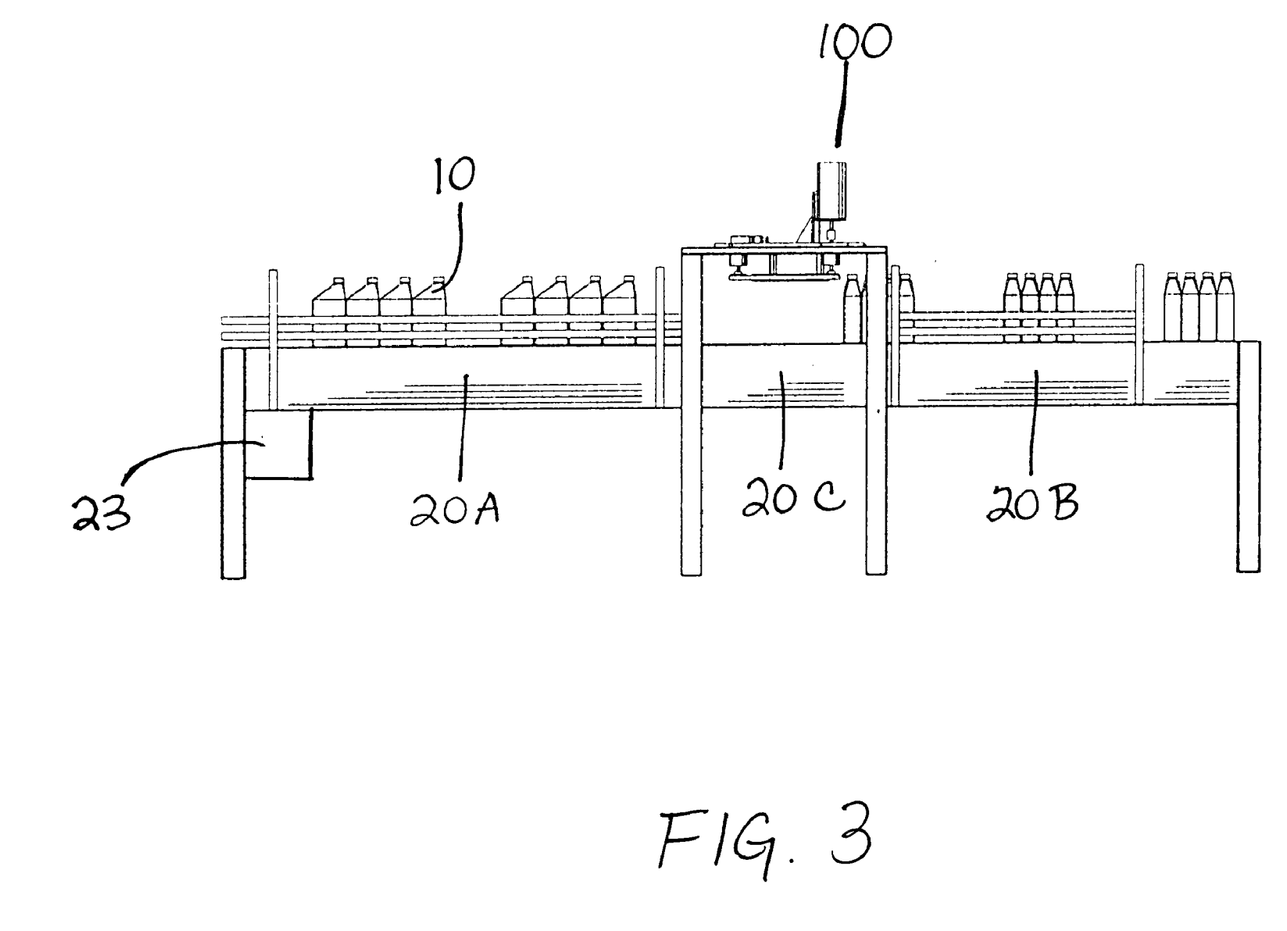
FIG. 3 is a side elevational view of the apparatus shown in FIG. 2.

The container handling system includes a conveyor system 20 that moves the containers from location 14 to location 15, first container guide means 30A for guiding the containers along predetermined paths in single file to the in-feed side of the container reorienting apparatus 100 and a second container guide means 30B downstream of the apparatus 100. The conveyor system 20 maybe a single conveyor unit but preferably is at least two units and most preferably three units. Referring to FIG. 3 there is an in-feed conveyor unit 20A upstream of the reorienting apparatus 100 and an out-feed unit 20B downstream of the apparatus 100 and a third conveyor unit 20C located below the apparatus 100. The third unit could in some instances be omitted in which case the apparatus 100 would also serve to transport the containers from the in-feed to the out-feed conveyor. Means (not shown) are provided to group together a selected number of containers for packaging and this maybe accomplished by suitably controlling the relative speeds of the conveyors in the system of conveyors and/or gates or means resisting the flow of the containers at a selected suitable location.

The conveyors 20A, 20B, and 20C maybe any type of conveyor 21 for example a belt or slat type that supports the containers on the upper surface thereof. The upper surface is preferably provided by the upper flight of an endless slat type conveyor mounted on a supporting structure 22. The slat material can be chosen to provide suitable frictional engagement with the containers to minimize the force required to turn the containers. All of this portion is well within the realm of expected skill and thus need not be described in further detail other than to indicate the conveyor (or conveyor units) is/are driven by a suitable drive train and motor 23.

The first and second container guide means 30A and 30B are essentially the same with each being a rack type unit that has a plurality of partition walls 31 spaced apart from one another laterally with respect to the direction of travel of the containers. The partition walls 31 are bars(or panels if desired) suspended from spaced apart support frame members 32 and 33 located at respective opposite ends thereof and which have a pair of legs 34, 35 attached to the conveyor support structure 22. The laterally spaced apart partition walls define channel ways that guide the containers along the lanes 11, 12 and 13. The partition walls are suitably spaced from one another for the containers to be in single file along the respective lanes taking into account the facial orientation of the containers. The partitions are closer to one another in the guide unit 30A upstream of the apparatus 100 than in the Unit 30B downstream therefrom.

The container reorienting apparatus 100 comprises a plurality of modular units 101 adjustably mounted on a rigid frame 102 that is supported by four posts 103 at a suitable elevation, as will become more apparent hereinafter, above the containers on the transporting conveyor system 20. The rigid frame 102 has slotted apertures 102A and 102B for attaching the same to each of the respective four support posts 103 and a pair of elongate slots designated respectively 102C and 102D for mounting the modular units 101 on the frame. The frame 102 is essentially a peripheral frame surrounding an open window area designated 102E. There is a pair of modular units 101 mounted on the frame 102 for each lane of containers and each has a frame portion thereof projecting downwardly through the open window.

Figure 4:
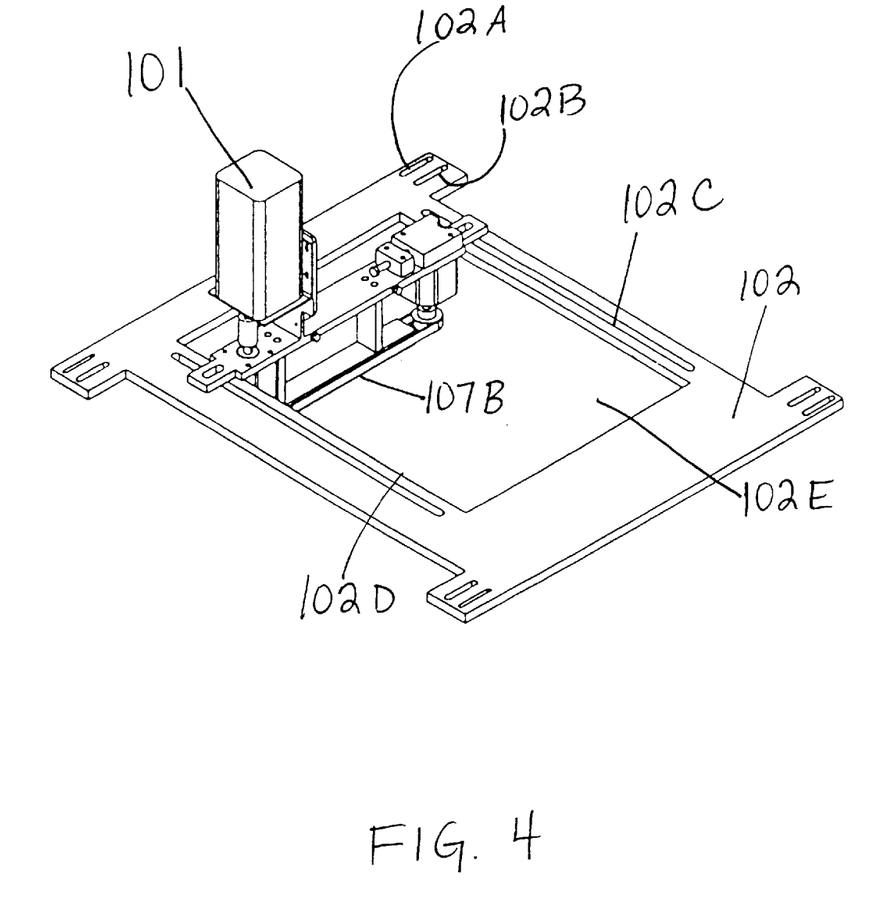
FIG. 4 is an oblique view of one modular unit of the present invention mounted on a frame.
Figure 6:
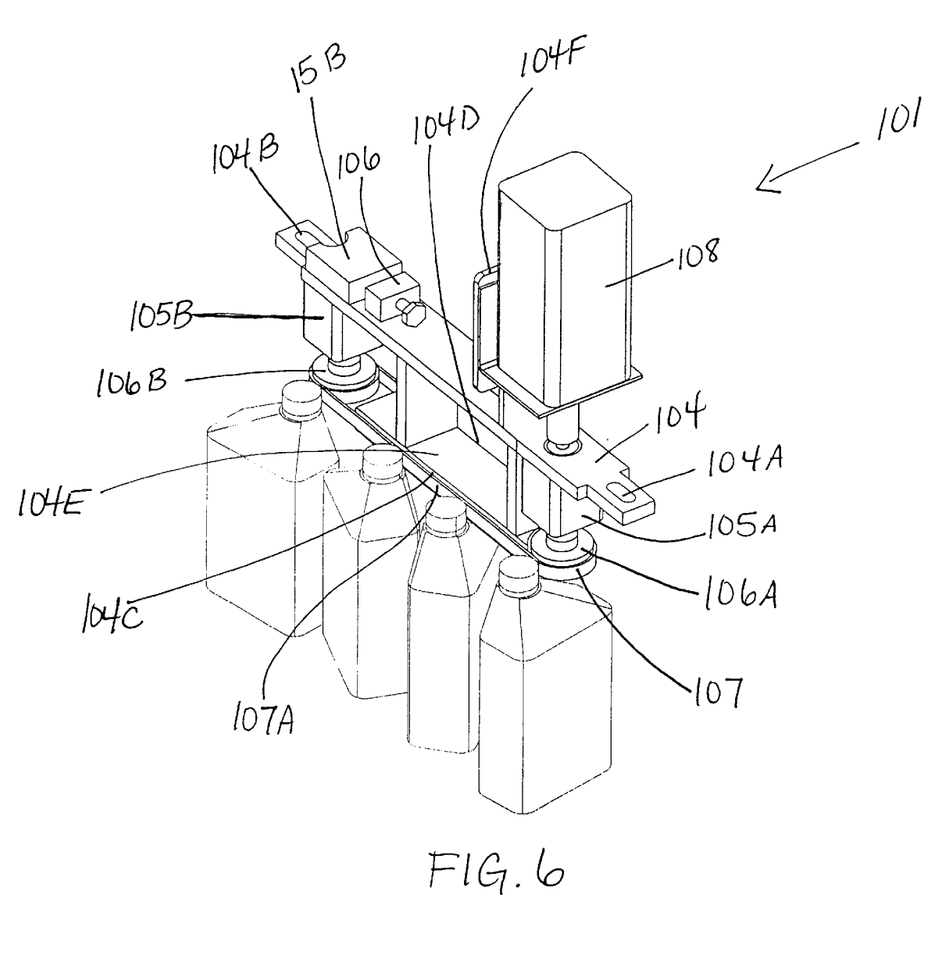
FIG. 6 is an oblique view on a somewhat larger scale of an individual modular unit of the container reorienting apparatus.
Figure 7:
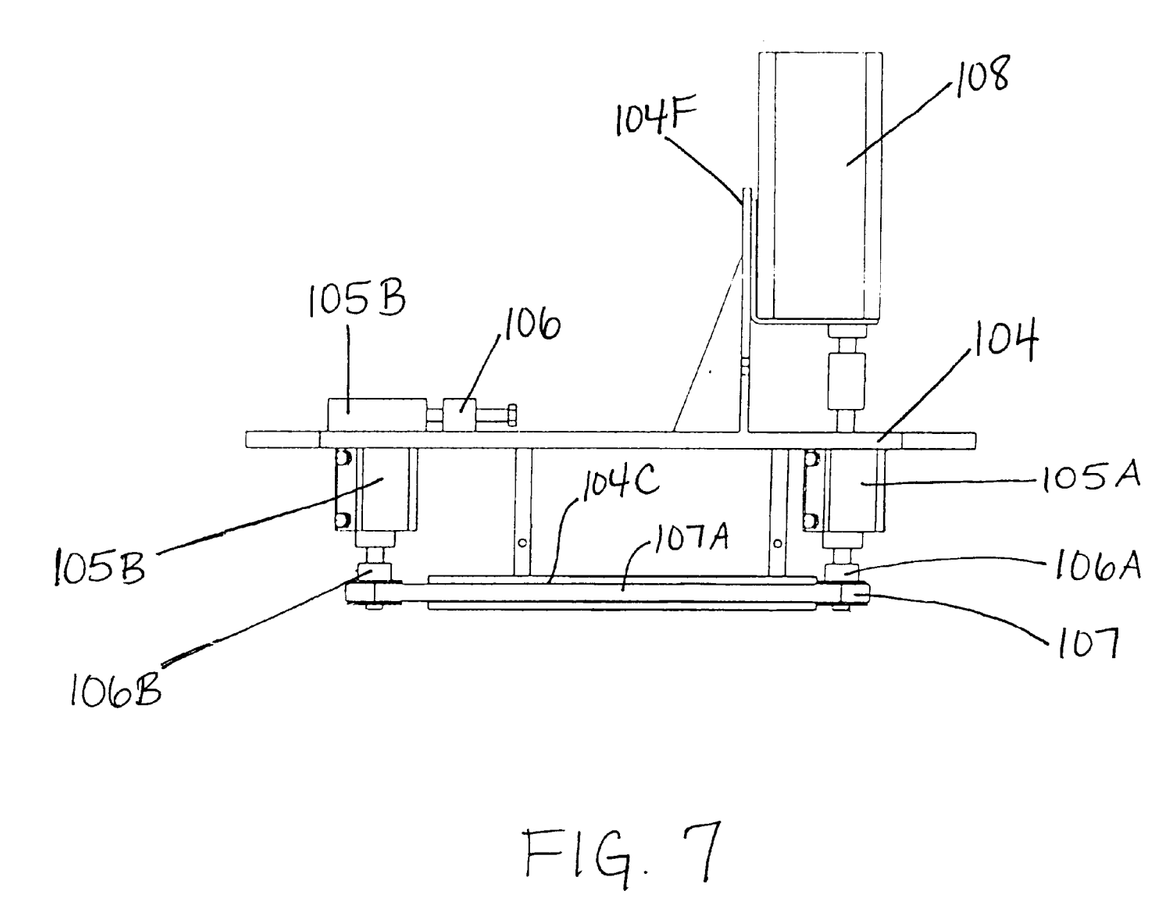
FIG. 7 is a side elevational view of the modular unit shown in FIG. 6.

An individual modular unit 101 is illustrated in FIGS. 4 and 6 and comprises a rigid frame 104 with slotted apertures 104A and 104B in respective opposite ends thereof for attaching the same by suitable bolt and nut assemblies to the rigid frame 102 utilizing the slots 102C and 102D. The frame slots 102C and 102D in the frame 102 permits sliding the modular units to a suitable location on such frame in a direction transverse to the direction of travel of the containers and the modular unit frame slotted apertures 104A and 104B permits changing the angular positioning of the modular units relative to such direction of travel for the installation at hand. The modular units when suitably positioned are anchored in that position by bolt and nut assemblies.

The modular unit 101 has a first bearing block and shaft assembly 105A fixedly secured to the frame 104 and a second bearing block and shaft assembly 105B slidably mounted on the frame and spaced from the bearing block unit 105A. The bearing block unit 105A is adjustably moveable in a direction away from the unit 105B by a screw jack device 106 that is mounted on the frame 104. Belt pulleys 106A and 106B are attached to the shaft of the respective bearing block and shaft assemblies 105A and 105B. A belt 107 is looped around these pulleys and has flight spans 107A and 107B engage able with respective belt back-up wear plates 104C and 104D mounted on a portion 104E of the rigid frame 104 and located below the frame 102. The wear plates maybe provided with replaceable friction reducing wear surfaces such as pads made of Teflon material or the like or in some instances depending upon surface irregularities on the containers it maybe desirable to have the wear plates made of resilient material or spring biased to a belt span engaging position. The belt by way of example maybe an 'L' gear belt having a ⅜" pitch, ½" wide, 32.25" pitch length with 86 teeth. Although not required, the belt of the preferred embodiment is coated with ⅛" top layer of LINTEL.

A motor 108 is mounted on a plate 104F on the frame 104 and such motor is drivingly connected to the shaft on which the belt pulley 106A is mounted and thus drives the belt. The motor maybe a variable speed motor with precise speed control or drivingly connected to the shaft associated therewith by a specific preselected gear ratio drive the purpose of which will become apparent hereinafter. In a system involving a number of pairs of modular units mounted on a frame 102 two drive motors maybe provided in place of the motor 108 on each unit with one motor driving one belt in the pairs of modular units and the other motor driving the other belt of such pairs of modular units. When using two motors there is a drive system of chains and sprockets to synchronize the driving of one belt of one modular unit in the respective pairs of modular units and another system of sprockets and chains for the other motor to synchronize the driving of the other belts as well as provide the proper ratios for the required differential speed of the belts for the installation at hand. Obviously one drive motor and a suitable drive train system maybe used to drive the two belts in each pair and at a preselected speed differential.

Figure 2:
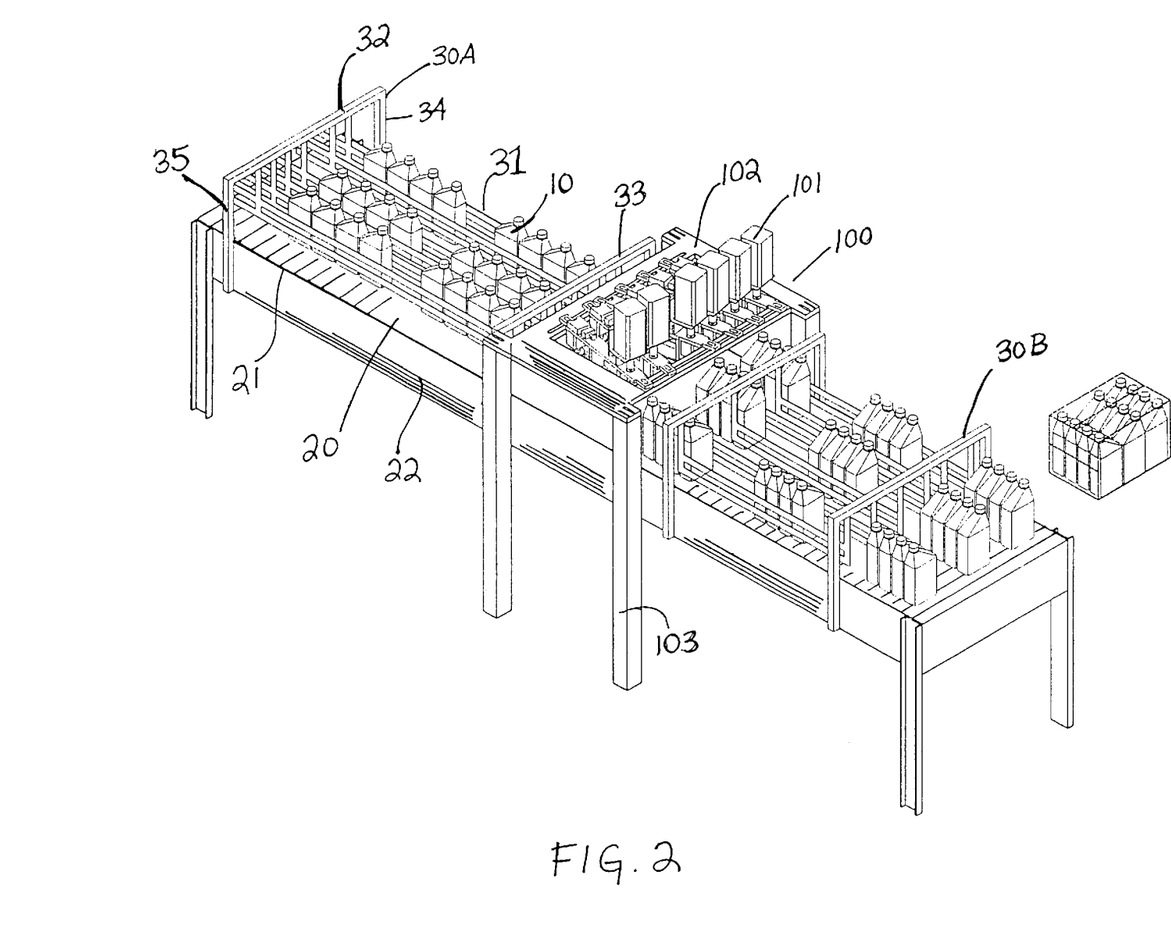
FIG. 2 is an oblique view of the apparatus diagrammatically illustrated in FIG. 1 and showing the major components of the system.
Figure 5:
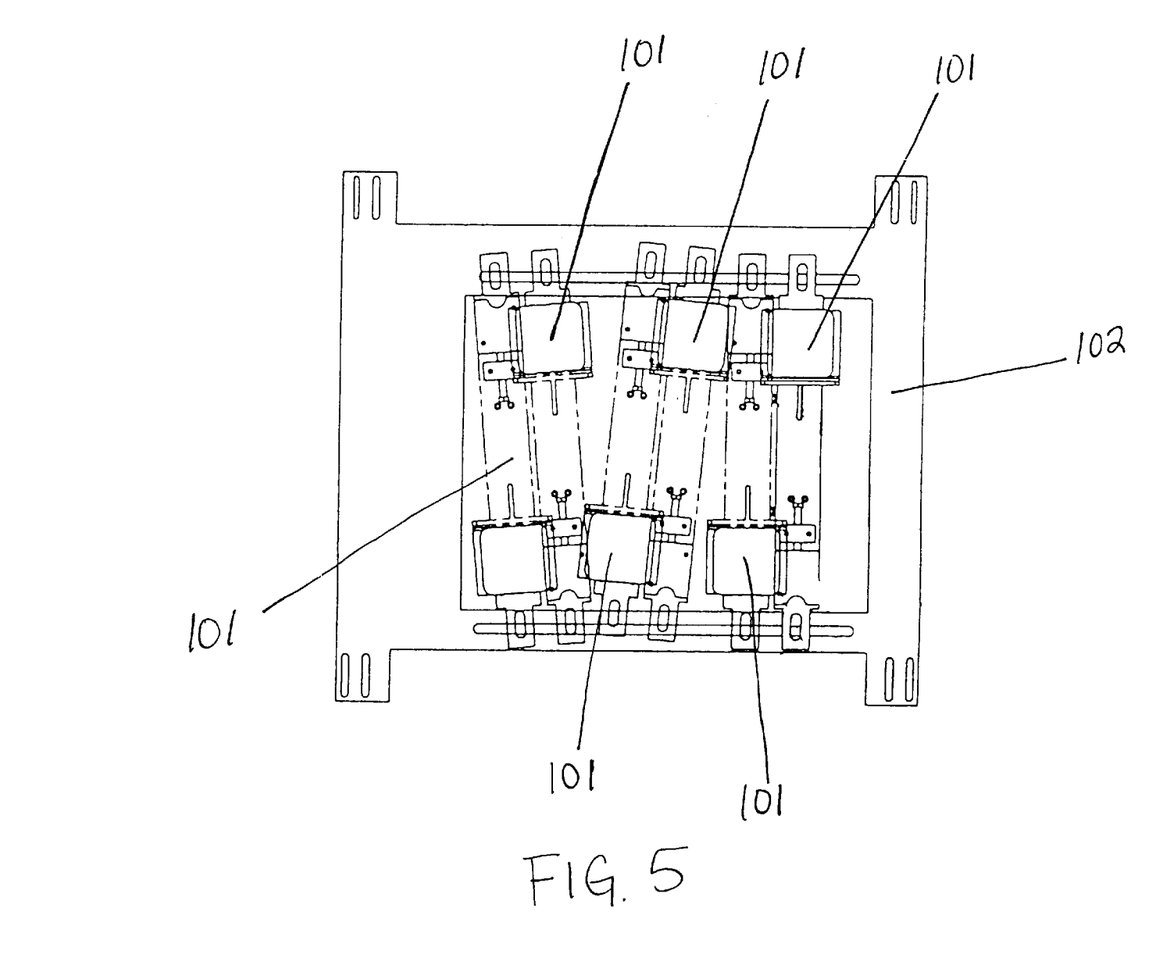
FIG. 5 is a top plan view of the frame shown in FIG. 4 having a plurality of pairs of the modular units for reorienting the individual containers in the respective lanes thereof illustrated in FIGS. 1 and 2.

Referring to FIG. 5 there are 6 modular units 101 mounted on the frame 102 with the frame portion 104E thereof projecting downwardly through the open window 102E. Adjacent modular units 101 are reversed from one another on the frame 102 to satisfy space availability. Moreover, by alternately positioning every other motor at an opposing end of the frame, all of the opposing motors can be installed having the same polarity which reduces the number of readily available motors which must be maintained in stock. Alternatively, for each pair of motors, every other opposing motor as shown in FIG. 2 must have opposite polarities in order for the motors to run in a designated clockwise or counter-clockwise rotation to achieve the desired movement of the bottle in selected direction. Each container 10 has an upwardly projecting neck and the spacing between the belts 107 of two adjacent modular units is such as to grasp there between the necks of the containers moving in single file in the respective lanes. The container turning device comprises two counter-rotatable members which in this preferred embodiment comprises two endless driven belts for each lane of containers. The span of the respective belts that engages opposite portions of a container travels in the same direction as the product flow with one traveling at the same speed as the product, or slightly slower, and the other faster and generally substantially faster. This action forces the container to rotate and in the instant case that rotation is approximately 90 degrees bringing it perpendicular to its original orientation. The amount of rotation is dependent upon the relative speeds of the two belts grasping the container neck there between and the retention time of that grasp. By using suitable gearing and/or selected drive speeds through precision speed control regulators for the motors the degree of rotation can be preselected for the installation at hand. In installations involving random container orientation on the in-feed container unit 20A a pre-orientation device maybe used such as appropriately positioned stops, dogs or releaseable catches to bring the containers to a desired orientation for in-feeding into the reorientation apparatus 100.

In the forgoing system there is a conveyor system for linearly moving a succession of containers and guide means to guide the containers in single file along a plurality of side-by-side lanes. There is a container reorientation apparatus in which there is a pair of modular units mounted on a frame for each of the lanes of containers. Each modular unit has a power driven endless belt and each pair of modular units provides two belt conveyors that grasp there between a selected portion of the container. The two belts in each of the pairs are driven at speeds differing from one another and that speed differential rotates the containers changing the facial orientation thereof. The pairs of belts are situated at a suitable elevation above the container conveying conveyor to grasp just the neck portion of the container in the instant case but that location of grasp could vary from one installation to another depending upon the outline shape of the containers being handled. Suitable conveyor control and/or gate means groups together a predetermined number of containers for packaging. The modular units are movably mounted on the frame and thereby can be adjustably positioned to suit the location of the respective multiple lanes and angled to suit the different lane widths. In the specific installation at hand the container necks are offset from the axis of the container and they are so grouped and oriented that at the packaging station at end of the described system twelve containers are placed in an erected carton with the bottle necks oriented to the carton walls to provide optimal structural support for stacking one carton on another for transportation and storage.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A container handling and alignment apparatus, comprising:

a conveyor for supporting and moving containers from a first location to a second location downstream from said first location;

means for guiding supported at an elevation above said conveyor to guide the containers in single file along each of a plurality of side-by-side lanes in a direction from said first location toward said second location;

a container reorienting apparatus disposed between said first and second locations, said container reorienting apparatus comprising a frame, a pair of modular units mounted on said frame for each of said respective lanes, each of said modular units having a power driven member mounted thereon whereby each pair of said modular units provide at least one power driven respective first and second pair of counter-rotatable members spaced apart from one another in a direction transverse to the lane associated therewith and located adjacent respectively opposite sides thereof, said counter rotatable members being at an elevation above said upper surface of the conveyor at a position whereby they engage respectively selected opposite side portions of said containers while said containers move a preselected distance along their respective paths;

variable speed means for driving connected respectively to said first and second counter-rotatable members of the respective pairs; and said container reorienting apparatus frame has a central open portion and means attaching respectively opposite ends of the respective modular units to said frame with the rotatable member associated therewith located at a lower elevation than said frame.

2. The container handling and alignment apparatus as defined in claim 1, wherein said means for guiding comprises a first and a second pair of guide units located respectively up-stream and down-stream of said container reorienting apparatus.

3. The container handling and alignment apparatus as defined in claim 1, wherein said counter-rotatable members comprise a pair of end-less belts.

4. The container handling and alignment apparatus as defined in claim 1, wherein said frame is a peripheral frame with a central open window and wherein each modular unit has a portion thereof projecting downwardly through said open window.

5. The container handling and alignment apparatus as defined in claim 4, wherein each said modular unit comprises a rigid elongate member attachable adjacent respective opposite ends thereof to opposed legs of said peripheral frame, a first and a second pair of shaft and bearing block assemblies mounted on said elongate member at respective first and second spaced apart positions thereon, said shafts each having a belt pulley thereon at a location spaced from the elongate member, a belt looped around said pulleys, means adjustably moveably mounting one of said first and second shaft and bearing block assemblies for movement in a direction toward and away from the other to selectively adjustably vary the tension of the belt.

6. The container handling and alignment apparatus as defined in claim 5, including a motor mounted on said elongate member and drivingly connected to one of the shafts of said pair of shaft and bearing block assemblies.

7. The container handling and alignment apparatus as defined in claim 6, wherein said pair of modular units mounted on said frame each have a motor alternately positioned at an opposing end of an adjacent modular unit whereby the opposing motors have the same polarity.

8. The container handling and alignment apparatus as defined in claim 5, wherein said peripheral frame has an elongate slot in each of said opposed legs permitting positioning the modular units at different locations in a direction across said paths.

9. The container handling and alignment apparatus as defined in claim 8, including an elongate slot in at least one of said opposite ends at the modular unit rigid elongate member to permit positioning the same at various different angular positions relative to the paths of travel of the containers.

10. A container handling and alignment apparatus, comprising:

a conveyor for supporting and moving containers from a first location to a second location downstream from said first location;

means for guiding supported at an elevation above said conveyor to guide the containers in single file along each of a plurality of side-by-side lanes in a direction from said first location toward said second location;

a container reorienting apparatus disposed between said first and second locations, said container reorienting apparatus comprising a frame, a pair of modular units mounted on said frame for each of said respective lanes, each of said modular units having a power driven member mounted thereon whereby each pair of said modular units provide at least one power driven respective first and second pair of counter-rotatable members spaced apart from one another in a direction transverse to the lane associated therewith and located adjacent respectively opposite sides thereof, said counter rotatable members being at an elevation above said upper surface of the conveyor at a position whereby they engage respectively selected opposite side portions of said containers while said containers move a preselected distance along their respective paths; and means for driving connected respectively to said first and second counter-rotatable members of the respective pairs further comprising a motor mounted on each modular unit alternately positioned at an opposing end of each pair of adjacent modular units wherein said opposing motors have the same polarity.

11. The container handling and alignment apparatus as defined in claim 10, wherein said counter-rotatable members comprise a pair of end-less belts.

12. The container handling and alignment apparatus as defined in claim 10, wherein said means for driving connected respectively to said first and second counter-rotatable members of the respective pairs is a variable speed motor.

13. The container handling and alignment apparatus as defined in claim 10, wherein said conveyor means comprises a first in-feed and a second out-feed conveyor located respectively up-stream and down-stream of said container reorienting apparatus.

14. The container handling and alignment apparatus as defined in claim 13, including a third conveyor that is interposed between said first and second conveyors.

15. The container handling and alignment apparatus as defined in claim 13, wherein said means for guiding comprises a first and a second pair of guide units located respectively up-stream and down-stream of said container reorienting apparatus.

16. The container handling and alignment apparatus as defined in claim 10, wherein said container reorienting apparatus frame has a central open portion and means attaching respectively opposite ends of the respective modular units to said frame with the rotatable member associated therewith located at a lower elevation than said frame.

17. The container handling and alignment apparatus as defined in claim 16, wherein said frame is a peripheral frame with a central open window and wherein each modular unit has a portion thereof projecting downwardly through said open window.

18. The container handling and alignment apparatus as defined in claim 17, wherein each said modular unit comprises a rigid elongate member attachable adjacent respective opposite ends thereof to opposed legs of said peripheral frame, a first and a second pair of shaft and bearing block assemblies mounted on said elongate member at respective first and second spaced apart positions thereon, said shafts each having a belt pulley thereon at a location spaced from the elongate member, a belt looped around said pulleys, means adjustably moveably mounting one of said first and second shaft and bearing block assemblies for movement in a direction toward and away from the other to selectively adjustably vary the tension of the belt.

19. The container handling and alignment apparatus as defined in claim 18, including a motor mounted on said elongate member and drivingly connected to one of the shafts of said pair of shaft and bearing block assemblies.

20. The container handling and alignment apparatus as defined in claim 18, wherein said peripheral frame has an elongate slot in each of said opposed legs permitting positioning the modular units at different locations in a direction across said paths.

21. The container handling and alignment apparatus as defined in claim 20, including an elongate slot in at least one of said opposite ends of the modular unit rigid elongate member to permit positioning the same at various different angular positions relative to the paths of travel of the containers.

* * * * *